(No Model.)
T. M. FOOTE.
REFRIGERATING STRUCTURE.
No. 363,624. Patented May 24, 1887.
Fig. 1.
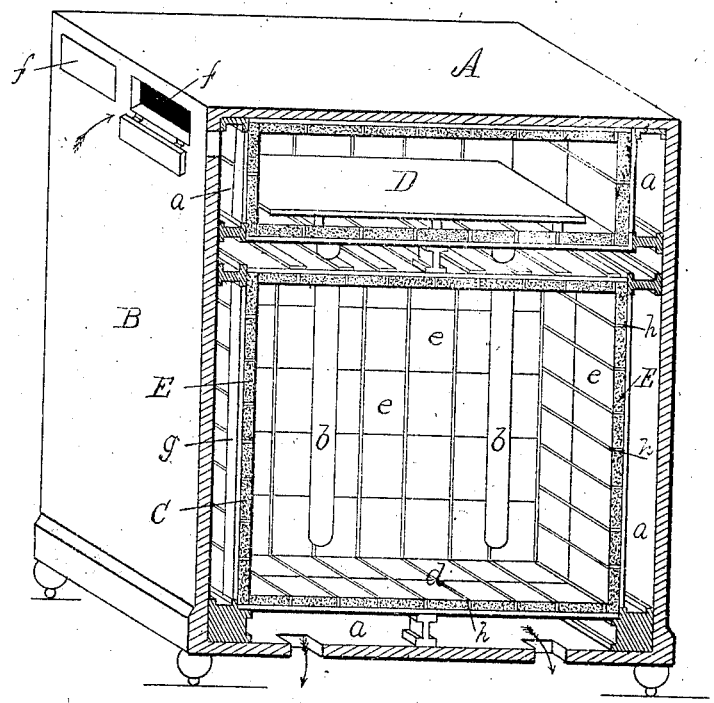
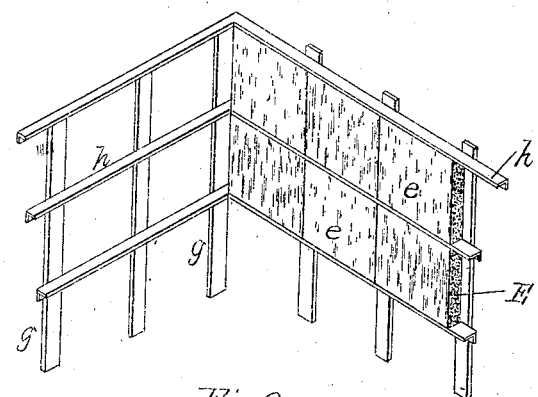
Fig. 2.
Witnesses.
H. E. Lodge
E. K. Boynton
Inventor.
Theo. M. Foote.
F. Curtis, Atty.

UNITED STATES PATENT OFFICE.

THEODORE MARSHALL FOOTE, OF BOSTON, MASSACHUSETTS, ASSIGNOR OF FIVE-EIGHTHS TO HENRY C. GOODSPEED, OF SAME PLACE, AND FRANKLIN REED, OF BATH, MAINE.

REFRIGERATING STRUCTURE.

SPECIFICATION forming part of Letters Patent No. 363,624, dated May 24, 1887.

Application filed October 14, 1885. Serial No. 179,887. (No model.)

*To all whom it may concern:*

Be it known that I, THEODORE MARSHALL FOOTE, a citizen of the United States, residing at Boston, in the county of Suffolk and State of Massachusetts, have invented certain new and useful Improvements in Refrigerating Structures; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to "refrigerating structures," so called, for the preservation of perishable articles of all descriptions—as meats, fruits, or vegetables; and it consists, first, in the arrangement of the structure, and, secondly, in the employment of a porous lining composed of some mineral substance, either alone or in combination with other materials which will render the compound to a certain degree porous.

It is a well-known fact in the principle of economic preservation of perishable materials that cold dry air is the best preventive against decay or deterioration, and it is chiefly to this end that my present improvements relate—viz., the continual absorption or abstraction of the moisture from the air cooled by the refrigerating material without increase or rise being caused in the temperature of said air. To accomplish this, I propose to employ some mineral substance which is porous to a certain extent—such as soft-burned brick, terra-cotta, or other analogous substances which are ready absorbents of moisture, and yet are at the same time, so to speak, impervious to the ready conduction of air or fluid; hence I propose to construct a refrigerating-chamber and provide it with an air-reservoir and a series of tubes or flues by which to increase the circulation. The walls of this chamber may be composed of, or, if desired, lined with, a porous material of the class before mentioned, while the outside of said substance is to be exposed to the air which fills the space existing between the refrigerating chamber and the inclosing superstructure.

The drawings represent, in Figure 1, a sectional elevation of a refrigerating structure containing my improvements, and Fig. 2 represents a detail view of the frame for supporting the plates of porous material.

In the drawings, A represents a refrigerating structure composed of an outside casing or superstructure, B, and the inner box or preserving-chamber, C, and so arranged that an air-space, a, shall exist between the two. This interposing medium effects a twofold purpose—it not only acts as a non-conductor to prevent rise in the temperature within the chamber C, which would otherwise occur, owing to the higher temperature of the surrounding external atmosphere, but it is the active agent by which the moisture contained in the air within the preserving-chamber is eliminated and abstracted.

This refrigerating structure in the present instance is shown as an ordinary portable house affair; but the same general arrangement and construction containing the gist of my invention may be embodied in structures adapted for railway-cars, permanent or fixed refrigerators, or for cold-storage warehouses.

In this apparatus I have disposed the ice-reservoir D in the top of the inner chamber, and have connected therewith a series of pipes, *b*, *b*, &c., which extend nearly to the floor *d* of the chamber, in order to increase the circulation throughout the same. This chamber B is composed of a suitable frame, the wall F of which I have constructed with a porous, preferably a mineral, substance, E, which may be composed of thin plates *e e*, &c., said plates being held together by means of the frame *g h*, and secured in any desirable way to the frame, care being taken to make tight joints between the individual pieces by the aid of cement of any proper kind.

Now, as before premised, I take some mineral substance—such as soft-burned brick, terra-cotta, or other analogous substances—and construct the walls or line the inner surface of the preserving-chamber. One of the peculiarities of such material is that, although it will hold water and prevent it running through, still it is perfectly porous; and for this reason I propose using any material substance, either pure or as a compound, which may possess such qualities. Having filled the reservoir D with ice and closed the box tightly, the air contained within the preserving-chamber becoming cooled, moisture at once begins to precipitate and collect upon the interior surface of the porous lining which at once absorbs it. On the other hand, the exterior surface of said lining E is exposed to the dry warmer air contained within the air-space a outside, and said moisture is gradually attracted by capillary attraction through said lining to its exterior surface, from which it is abstracted, evaporated, and passed away; hence it may be said that the air is dried by the gradual absorption and evaporation of the moisture contained in it through the medium of the external air, and moreover without any tendency to increase or rise of the temperature in the preserving-chamber—in fact, the converse or a diminution might be expected, since rapid radiation is always attended with a reduction in the temperature.

Since the air-space existing between the two structures B C exerts a strong influence in the successful operation of my invention, I propose to arrange and have so disposed openings or valves $f\ f$, &c., in the outer superstructure that more or fewer of them may be operated, thereby increasing or diminishing the change of air in the space, and accordingly vary the amount of radiation by inciting currents of air through the air-space.

I do not desire to be limited to any particular material of which these plates $e\ e$, composing the lining, may be made, since I may employ a mineral or incombustible material—such as silicious or infusorial earth. Moreover, analogous substances to these may be employed as a compound and manufactured under some one of the various methods for forming porous cells for galvanic or secondary batteries—such as mixing sirup, molasses, meal, or other destructible materials with the mineral base into a plastic mass and then subjecting the same to heat.

I am aware that linings have been formed which have not been porous, as well as from non-conducting fibrous porous materials; but the latter are generally made of vegetable fiber, and soon become foul, when their removal is a necessary consequence.

I claim—

1. A refrigerating-chamber having walls of absorbent mineral substance sufficiently porous to allow the moisture to pass through to its outer side, in combination with an outer shell or casing, an open air-space being between said inner walls and said outer shell, in order that the moisture percolating through the former from within may be evaporated by the air in said intervening space, substantially as set forth.

2. The combination, with the ice-reservoir D, superstructure B, and preserving-chamber C, with the intervening air-space $a$, of the porous mineral substance composing the walls or shell of said chamber and operating to dry the air within the latter by allowing moisture to pass through to the outer side of the wall of said chamber, where it is evaporated by the air moving in said space, substantially as and for the purposes set forth.

In testimony whereof I affix my signature in presence of two witnesses.

THEODORE MARSHALL FOOTE.

Witnesses:
 H. E. LODGE,
 F. CURTIS.